Oct. 20, 1953  A. H. THOMPSON  2,655,897
FLOUR DUSTING MACHINE
Filed Dec. 10, 1951  2 Sheets-Sheet 1

Almen H. Thompson
INVENTOR.

BY *Clarence A. O'Brien*
*and Harvey B. Jacobson*
Attorneys

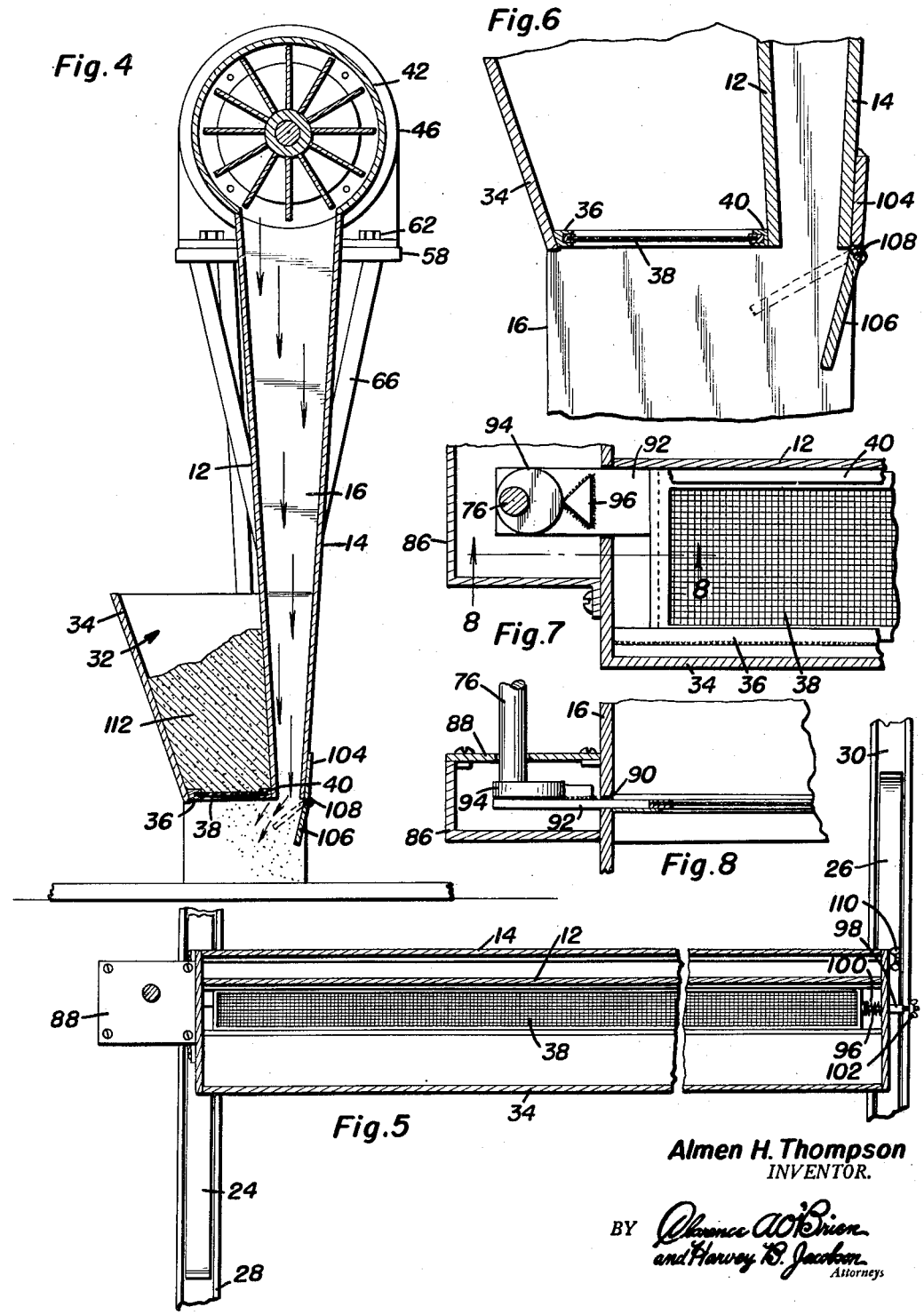

Patented Oct. 20, 1953

2,655,897

UNITED STATES PATENT OFFICE 2,655,897

FLOUR DUSTING MACHINE

Almen H. Thompson, Fargo, N. Dak.

Application December 10, 1951, Serial No. 260,805

3 Claims. (Cl. 118—308)

This invention relates generally to flour hoppers, and more particularly to a motor driven flour hopper having means for applying a uniform layer or film of flour of any desired thickness or density.

The primary object of this invention is to provide a motor driven flour hopper which blows a fine film of flour over a surface desired to be dusted.

Another object of this invention is to provide a motor driven flour hopper which both sifts the flour and applies it to a surface at the same time.

Another object of this invention is to provide a compact motor driven flour hopper in which the air distribution housing which forms the main frame of the hopper has motor drive means mounted thereon.

Another object of this invention is to provide simple drive means whereby both the blower for driving the air and the means for sifting the flour may be driven by a single motor.

A further object of this invention is to provide a motor driven flour hopper in which the volume and direction of air can be varied.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application, and in which:

Figure 4 is a transverse vertical sectional view taken substantially along the plane indicated by the section line 4—4 of Figure 1 and showing the construction and arrangement of the flour hopper;

Figure 5 is a horizontal sectional view taken substantially upon the plane indicated by the section line 5—5 of Figure 1 and showing the construction of the flour hopper from above;

Figure 6 is an enlarged partial transverse vertical sectional view showing the arrangement of the bottom of the flour hopper with respect to the exit opening for the air, and the adjustable means for controlling the volume and direction and flow of the air;

Figure 7 is an enlarged partial horizontal sectional view showing the means for reciprocating the flour sifter screen; and Figure 8 is a partial enlarged vertical sectional view taken substantially upon the plane indicated by the section line 8—8 of Figure 7.

Similar characters of reference designate similar or identical elements and portions throughout the specification and throughout the different views of the drawings.

Figure 1:
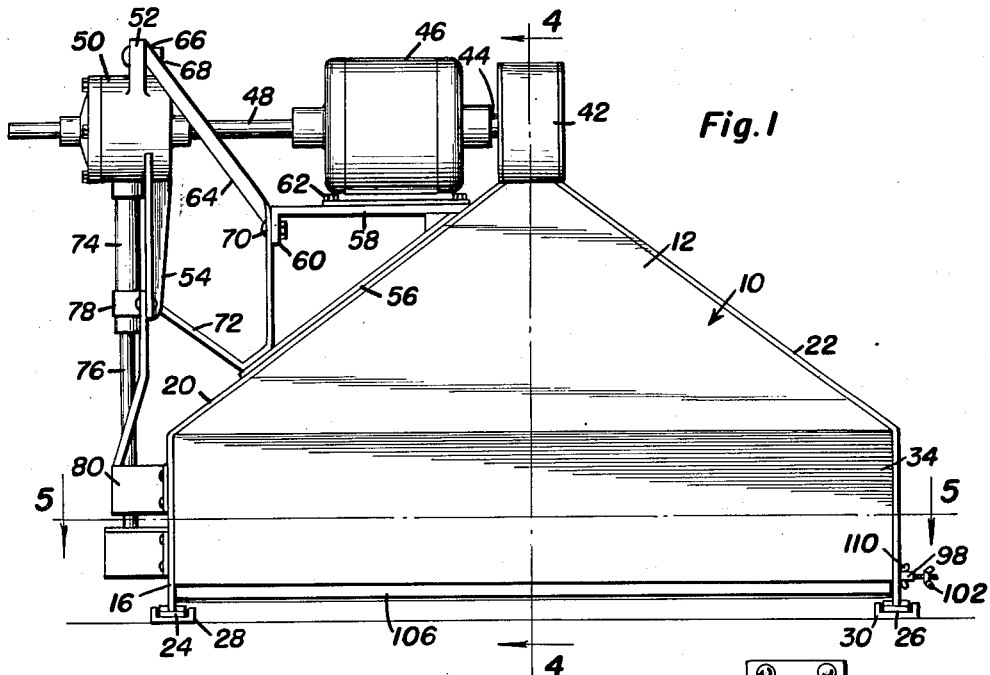
Figure 1 is a front elevational view of the motor driven flour hopper which is the subject of this invention.
Figure 2:
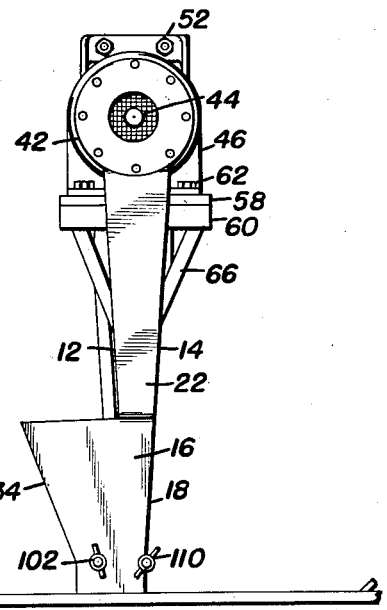
Figure 2 is an end elevational view of the motor driven flour hopper of Figure 1 as viewed from the right.
Figure 3:
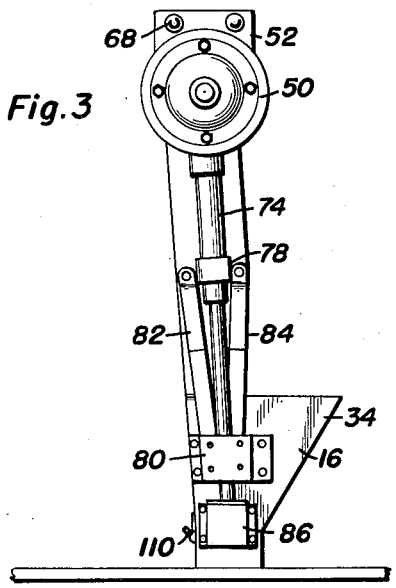
Figure 3 is another end elevational view of the motor driven flour hopper of Figure 1 as viewed from the left.

Referring now to the drawings in detail this invention includes an air distribution housing 10 which forms the main frame of the motor driven flour hopper. The housing 10 consists of a pair of downwardly converging sides 12 and 14, end walls 16 and 18, and top walls 20 and 22.

The end walls 16 and 18 form the main supporting legs of the machine, and have secured to their lower edges elongated feet 24 and 26. The elongated feet 24 and 26 are slidably mounted in elongated U-shaped trackways 28 and 30 respectively. While the machine is illustrated and described as being slidably mounted in the trackways 28 and 30, it is readily apparent that the elongated feet 24 and 26 may be secured to any base whereby the machine is made stationary. Although it is not shown, the machine may be mounted over a conveyor which either carries pans to be dusted or dough.

The end walls 16 and 18 extend forwardly of the front size 12 of the housing 10 and also provide end wall structure for a flour hopper 32. Extending between and secured to the edge of the ends 16 and 18 is a front side 34 of the flour hopper 32, which is in spaced converging relation to the front side 12 of the housing 10. The front wall 34, the front side wall 12, the end wall 16 and the end wall 18 form the vertical walls of the flour hopper 32. The bottom of the flour hopper 32 is closed by a reciprocating screen 36 which is mounted in C-shaped guides 38 and 40 secured to the wall 34 and the front side wall 12 respectively. The operation of the sifter screen 36 will be explained in more detail hereafter.

Referring now to Figure 1, it will be seen that mounted at the upper end of the housing 10 is a blower 42 which is in alignment with and secured to the shaft 44 of an electric motor 46. In alignment with and secured with a second shaft 48 of the motor 46 is a gear box 50. The gear box 50 is provided with an upwardly extending mounting flange 52 and a downwardly extending mounting bracket 54.

Carried by the top wall 20 in flush relation thereto is an elongated reinforcing plate 56. A horizontally disposed motor mounting plate 58 has one edge secured to the upper end of the reinforcing plate 56. The other end of the motor mounting plate 58 is provided with a downturned flange 60. The electric motor 46 is mounted on the motor mounting plate 58 by a plurality of bolts 62.

A V-shaped brace 64 has its doubled end portion 66 secured to the flange 52 on the gear box 50 by bolts 68, and extends downwardly and inwardly into engagement with the vertical flange 60 of the mounting plate 58. The brace 64 then extends downwardly and is secured to the upper surface of the reinforcing plate 56 adjacent its lower end. The brace 64 is secured to the flange 60 by bolts 70. One of the legs of the U-shaped brace 64 is provided with an extension 72 which extends upwardly and outwardly and is secured to the mounting bracket 54.

Extending downwardly from the gear box 50 is a tubular housing 74 through which extends and in which is rotatably journaled a drive shaft 76. The lower end of the tubular housing 74 is supported from the bracket 54 by a clamp member 78. Secured to the end wall 16 is a bracket 80 having mounted therein a bearing with an axis in alignment with the bore of the tubular housing 74. The gear box 50 is further braced by a pair of braces 82 and 84 extending between the bracket 80 and the bracket 54 and secured thereto.

Referring now to Figure 8 particularly, it will be seen that mounted on the end wall 16 adjacent the lower edge of the front wall 34 of the hopper 32 is a housing 86. The housing 86 is provided with a removable cover 88 through which extends the drive shaft 76. The end wall 16 is provided with an elongated slot 90 communicating the flour hopper 32 with the housing 86. Extending through the elongated slot 90 in sliding relation is an arm 92 which is secured to one edge of the flour sifter screen 36. Carried on the lower end of the drive shaft 76 is a cam member 94 overlying the arm 92. The arm 92 is provided with a triangular cam engaging plate 96, whereby the flour sifter screen 36 is reciprocated by engagement of the apex of the triangular cam engaging plate 96 with the cam 94 upon rotation of the drive shaft 76.

Referring now to Figure 5, it will be seen that the opposite end of the flour sifter screen 36 is provided with an elongated rod 96 which is reciprocatingly received in the bore of a sleeve 98 secured to the end wall 18 in alignment with an aperture therethrough. Mounted on the rod 96 between the end of the flour sifter screen 36 and the interior of the end wall 18 is a compression spring 100 which constantly urges the flour sifter screen to the left against the motion of the cam 94. The rod 96 is provided at its outer end with a stop nut 102 threadedly received thereon.

Referring now to Figure 6, it will be seen that the lower edge of the rear side wall 14 is provided with an elongated plate 104 secured to the edge thereof. Pivotally secured to the hinge plate 104 is a lower hinge plate 106 which is secured to the hinge pin 108 which is rotatably mounted at the lower end of the hinge plate 104. As is shown in dotted lines, the hinge plate 106 is movable in and out of the path of the air stream passing through the lower end of the air distribution housing 10, whereby the volume and direction of the air may be varied. Secured to the end of the pivot pin 108 is a wing nut 110 for rotating the hinge plate 106.

In view of the foregoing, it is believed to be apparent that when the electric motor 46 is operated, the flour sifter screen 36 is reciprocated back and forth thereby sifting flour 112 out of the hopper 32. As the same time air is being blown out of the bottom of the air distribution housing 10 and finely distributes the sifted flour over objects placed under the machine.

The operation of this machine will be understood from the foregoing description of the mechanical details thereof, taken in connection with the above recited objects and the drawings. Further description would appear to be unnecessary.

Minor modifications of the machine varying in minor details from the embodiment of the machine illustrated and described here, may be resorted to without departure from the spirit and scope of this invention, as defined in the appended claims.

Having described the invention, what is claimed as new is:

1. A flour dusting machine comprising a vertical air distribution housing, blower means carried at the upper end of said air distribution housing, said air distribution housing tapering towards the lower end and increasing in length and decreasing in width, a flour hopper carried by said air distribution housing adjacent a lower air outlet end thereof, said flour hopper extending along the length of said air distribution housing, flour distributing means in the form of a reciprocatory sifting screen across a bottom of said flour hopper, said screen being disposed immediately adjacent said lower air outlet and blown air from said blower means evenly distributing sifted flour from said flour hopper.

2. A flour dusting machine comprising a vertical air distribution housing, blower means carried at the upper end of said air distribution housing, said air distribution housing tapering towards the lower end and increasing in length and decreasing in width, a flour hopper carried by said air distribution housing adjacent a lower air outlet end thereof, said flour hopper extending along the length of said air distribution housing, flour distributing means in the form of a reciprocatory sifting screen across a bottom of said flour hopper, said screen being disposed immediately adjacent said lower air outlet and blown air from said blower means evenly distributing sifted flour from said flour hopper, a plate hingedly carried by said lower air outlet end at a side remote from said flour hopper, said plate being selectively disposable in the path of blown air for varying the volume and direction of flow of the blown air.

3. In a pastry producing line including an elongated pan support for use in connection with pastry forming machines an air distribution housing, blower means carried at the upper end of said air distribution housing, a flour hopper carried by said air distribution housing adjacent its lower end, means for distributing flour from said flour hopper, said blower means being driven by a motor mounted on said air distribution housing in alignment with said blower means, said motor also operating said flour distributing means, trackways disposed along opposite edges of said pan support, said air distribution housing having spaced feet slidably retained in said trackways, said air distribution housing being movable along said pan support for selectively coating pans supported thereby.

ALMEN H. THOMPSON.

References Cited in the file of this patent

UNITED STATES PATENTS

| Number | Name | Date |
|---|---|---|
| 432,912 | Smith | July 22, 1890 |
| 637,666 | Richter | Nov. 21, 1899 |
| 1,310,815 | Weaver | July 22, 1919 |
| 1,482,495 | Westhaver | Feb. 5, 1924 |
| 1,797,112 | Welsh et al. | Mar. 17, 1931 |
| 1,970,336 | Pointon et al. | Aug. 14, 1934 |
| 2,476,465 | Tarrant | July 19, 1949 |
| 2,505,243 | Hewitt et al. | Apr. 25, 1950 |